United States Patent [19]

Gonzalez

[11] Patent Number: 5,628,682
[45] Date of Patent: May 13, 1997

[54] BALLISTICALLY PROTECTIVE AIR PASSAGE

[75] Inventor: Rene G. Gonzalez, Oakland County, Mich.

[73] Assignee: The U.S. Government as represented by the Secretary of the Army, Washington, D.C.

[21] Appl. No.: 370,133

[22] Filed: Jan. 9, 1995

Related U.S. Application Data

[63] Continuation of Ser. No. 77,759, Jun. 17, 1993, abandoned.
[51] Int. Cl.$^6$ ....................................................... B60H 1/30
[52] U.S. Cl. ............................ 454/143; 454/147; 454/902
[58] Field of Search ............................... 454/76, 77, 82, 454/86, 96, 98, 107, 111, 143, 146, 147, 902

[56] References Cited

U.S. PATENT DOCUMENTS

| | | | |
|---|---|---|---|
| 850,160 | 4/1907 | Hodge et al. | 454/96 |
| 1,342,152 | 6/1920 | Bennett | 454/111 |
| 2,158,801 | 5/1939 | Petterson | 454/143 X |
| 4,242,951 | 1/1981 | Bemiss | 454/146 |
| 4,601,510 | 7/1986 | Schoppel et al. | 454/147 X |
| 5,113,700 | 5/1992 | Coburn | 89/36.02 |

*Primary Examiner*—Harold Joyce
*Attorney, Agent, or Firm*—Peter A. Taucher; David L. Kuhn

[57] ABSTRACT

A low signature, low restriction, ballistically protective air intake assembly for an exteriorly armored structure. The assembly is provided is comprised of one or more ducts having an entry end, an exit end and a spiralled duct portion between the ends. The entry ends communicate with an intake bell of armor material. The intake bell curves both away from the duct and out from duct openings at the entry ends. At the exit ends of the ducts are armor members faced toward the duct openings at the entry end. The armor members are positioned such that the spiralled duct portions lie between the armor members and the intake bell. Projectiles such as bullets travelling toward the entry end duct openings are either deflected away by the bell or caught by the armor member, whereby ballistic protection exists for elements in the armored structure interior to the assembly.

12 Claims, 6 Drawing Sheets

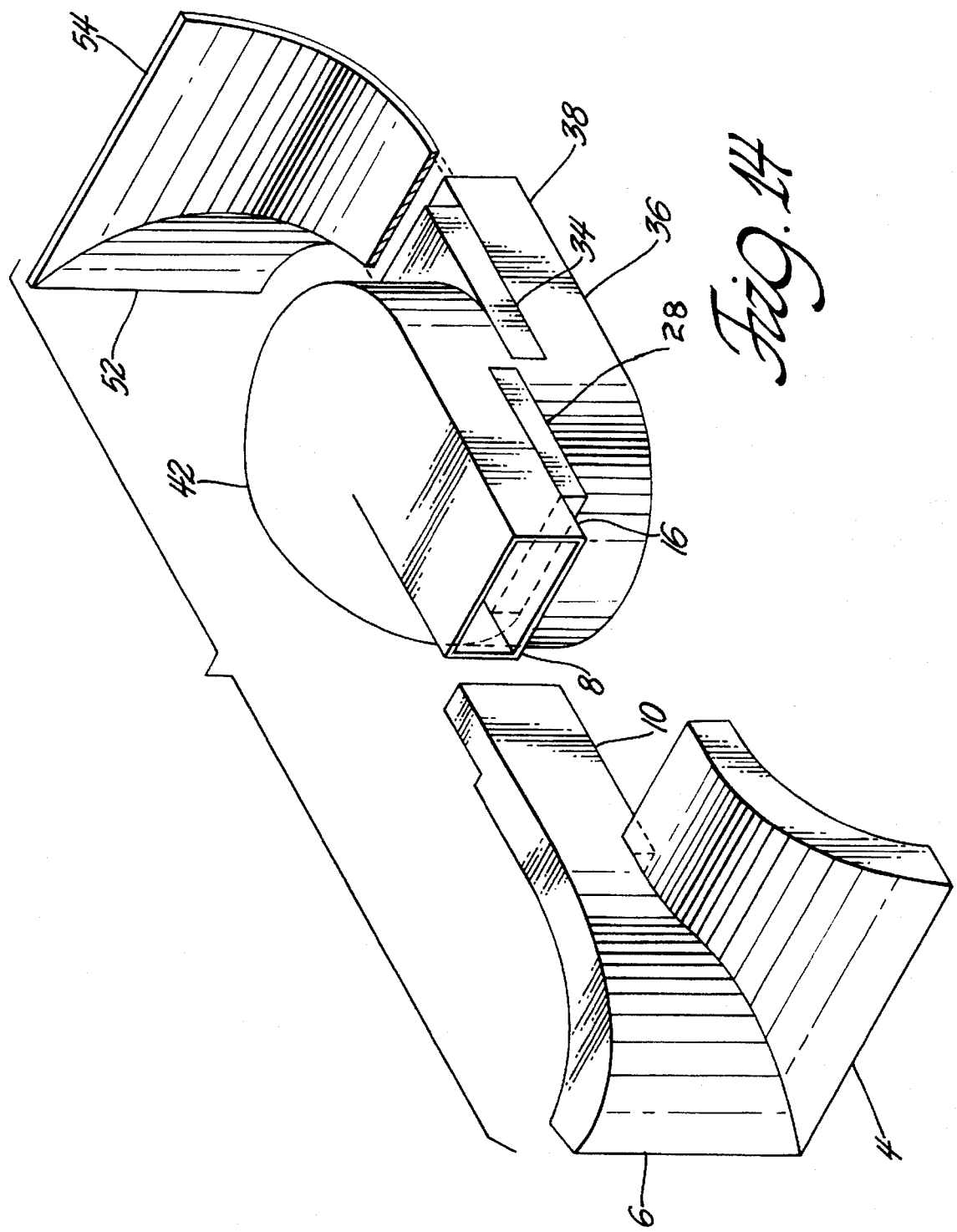

5,628,682

BALLISTICALLY PROTECTIVE AIR PASSAGE

GOVERNMENT USE

The invention described herein may be manufactured, used and licensed by or for the U.S. Government for governmental purposes without payment to me of any royalty thereon.

This application is a continuation of application Ser. No. 08/077,759 filed 17 Jun. 1993 abandoned.

BACKGROUND AND SUMMARY

The invention herein relates to air intakes or exhausts for armored combat vehicles or other structures that are exposed to enemy projectiles such as bullets or shell fragments.

Air intake and exhaust openings are potential points of vulnerability where projectiles can penetrate an armor covering and harm personnel or components inside the covering. Consequently, various means have been developed to protect intake and exhaust openings, the most common protective means being a set of overlapped slats of armor covering these openings. Two problems exist with overlapped slats. One problem is that the slats tend to restrict air flow and another problem is that such slats typically have an identifiable infrared image because they heat and cool faster than neighboring structure.

My invention is an air passage that solves the problem of protecting intake or exhaust openings while reducing air flow restriction and infrared signature. My air passage has ducts with outer open ends at the exterior of an armored structure and other open ends inside the armored structure. The outer ends are grouped adjacently together, and an outwardly flaring bell of armor material is disposed about the group of outer ends, the bell being free of slats or other flow restrictive, high-signature elements. Armor components abutting or integral with the bell form a continuous girdler about the group of outer ends. At the inner ends of the ducts are armor members faced toward the bell and toward the outer ends of the ducts. The ducts define spiralled sections between the inner and outer duct ends, the spiralled sections lying between the bell and the armor members. The juxtaposition of the bell, the ducts and the armor member prevent bullets or like projectiles from entering an armored structure through my air passage.

BRIEF DESCRIPTION OF THE DRAWINGS

FIG. 14 is an exploded perspective view of the module shown in FIGS. 1 and 2, except that spacers 40 and armor plate 44 are omitted from FIG. 14.

DETAILED DESCRIPTION

Figure 1:
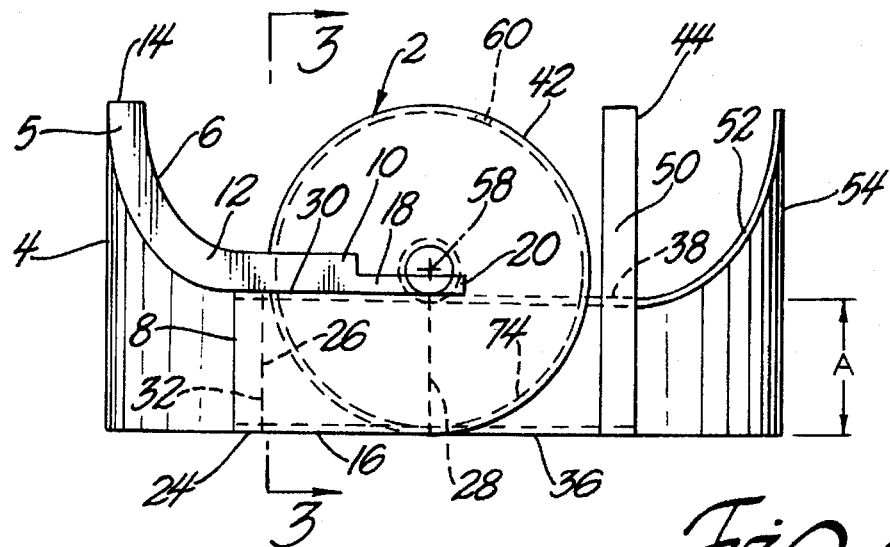
FIG. 1 is a plan view of a module of my air passage.
Figure 2:
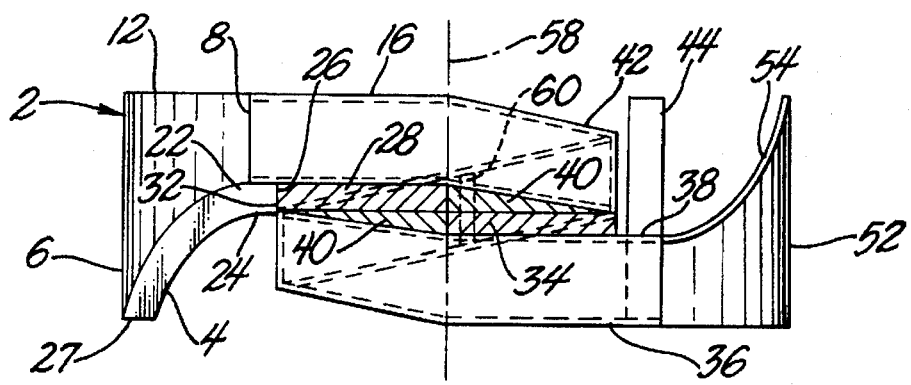
FIG. 2 is a side elevational view of the module.

FIGS. 1 and 2 are respectively a plan view and a side elevational view of a quarter module or subassembly 2 of my air passage. FIG. 14 is an exploded perspective view of subassembly 2 wherein tapered spacers 40 (FIG. 2) and plate 44 are omitted for convenience and clarity. Subassembly 2 has outwardly flared bell armor sections 4 and 6 at intake end 8 of straight duct section 16. At the juncture of the straight and curved portions of armor section 6 is a zone 12 thicker than the rest of section 6. The straight portion 10 of armor section 6 is slightly thinner than zone 12, faces against straight duct section 16 and has a stepped or thinner part 18 terminating at end face 20. Curved portion 5 of section 6 curves and slightly tapers from zone 12 to face 14. As seen in FIG. 2, the juncture of the straight and curved portions of armor section 4 has a zone 22 thicker than the rest of section 4, which curves and slightly tapers from zone 22 to face 26. The relatively short, straight portion 24 of armor section 4 faces against straight duct section 16, is slightly thinner than zone 22 and terminates at end face 26.

A first rectangular armor plate 28 faces against straight duct section 16, is perpendicular to straight portion 10 of armor section 6, has one of its longer plate edges 30 abutting straight portion 10 and has one of its shorter plate edges 32 abutting end face 26. A second, optional rectangular armor plate 34 is similar to first armor plate 28 and faces against straight section 36 of exit end 38 of the duct. As seen in FIG. 2, optional wedge-like spacers 40, which for some applications may be omitted, can be disposed between the rectangular armor plates and spiralled duct portion 42. The spacers are of armor steel or other armor material, and preferably are of a relatively malleable, "soft," and ductile armor material that tends to catch flying fragments rather than deflect them. Flared armor sections 4 and 6 are preferably made of a relatively harder and less malleable armor material that tends to deflect or break up projectiles rather than catch them. Plate 28, plate 34 and spacers 40 are shown as being sectioned in FIG. 2 in order to more clearly distinguish them from surrounding structure. These elements extend across the width "A" of the straight sections 16 and 36 of the duct.

Figure 4:
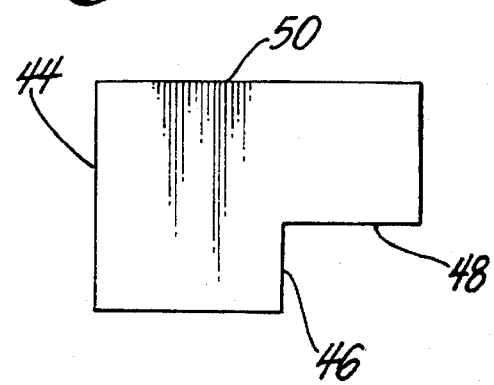
FIG. 4 shows the facial shape of an armor plate whose edges are seen in FIGS. 1 and 2.

At duct exit end 38 is armor plate 44, which is normal to duct straight section 36 and which, like the spacers, is made of a relatively "soft" armor material. As seen in FIG. 4, plate 44 has two adjoining edges 46 and 48 which define a step or notch for fitting this plate onto duct straight section 36. Plate 44 has an edge 50 that faces the viewer in FIG. 1. Also at duct exit end 38 are curved bell wall sections 52 and 54, which normally have the same wall thickness as the duct and can in fact be integral extensions of the duct.

Figure 3:
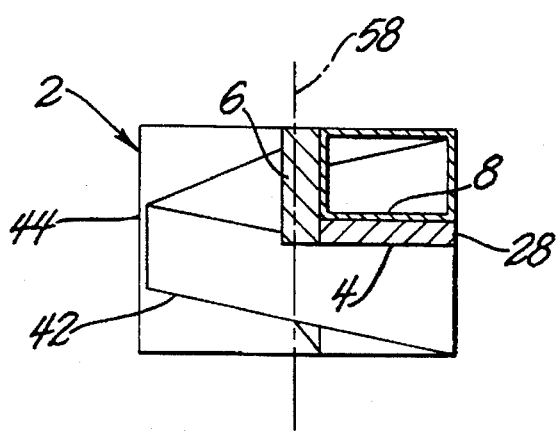
FIG. 3 is a view taken along line 3—3 in FIG. 1.
Figure 5:
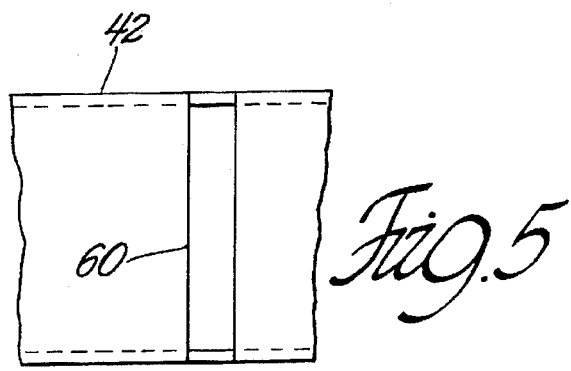
FIG. 5 is a detail view of a debris disposal slot in the duct shown in FIGS. 1 through 3.

As can be understood in conjunction with FIGS. 1, 2 and 3, air enters the duct at intake end 8 passes through straight section 16 and then enters spiralled duct portion 42. The air in portion 42 flows around axis 58 and a short distance along the axis, then passes through duct straight section 36 and out duct exit end 38. While the air is in spiralled duct portion, it passes narrow elongate slot 60 (FIGS. 1, 2 and 5), which is oriented parallel to axis 58. Slot 60 allows water droplets or foreign particles in the turning air stream in duct portion 42 to be centrifuged out of the duct, whereby slot 60 performs an air filtering or cleaning function. Subassembly 2 can be an air exhaust mechanism wherein entry end 8 of the duct becomes an exhaust port, in which case slot 60 will be eliminated.

Figure 11:
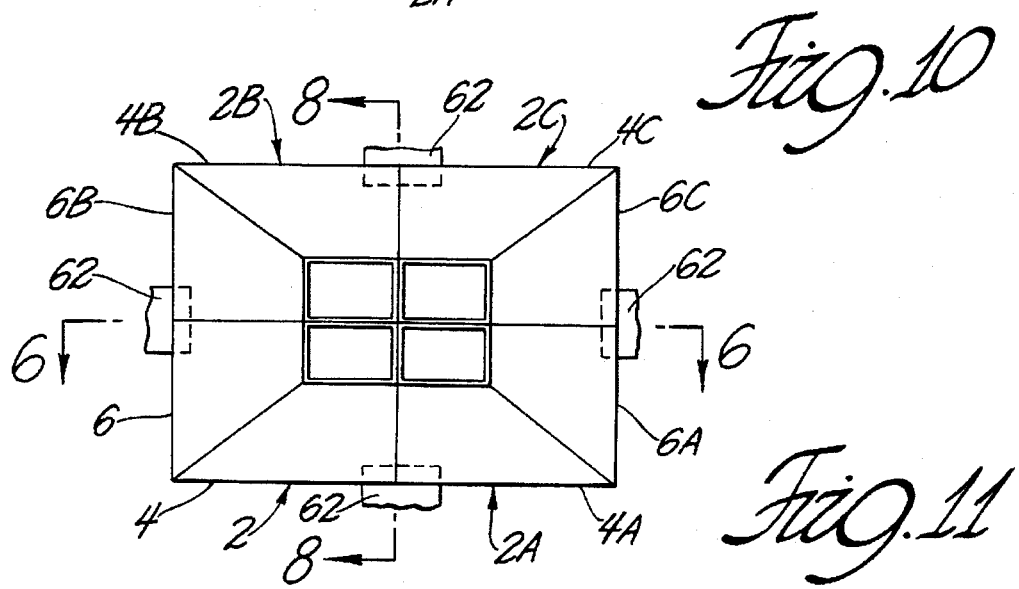
FIG. 11 is an end view of the air passage, hidden lines of the passage not being shown.

FIG. 11 is an end view of four quarter subassemblies (2, 2A, 2B and 2C) in a final air intake assembly, where subassemblies 2A and 2B are different mirror images of subassembly 2 and subassembly 2C is a mirror image of both subassembly 2B and subassembly 2A. Subassemblies 2A, 2B and 2C are further shown in FIGS. 6 and 8, whose elements having reference numerals with an "A," or "B," suffix. The elements having suffixed numerals are mirror-image analogues of elements in FIGS. 1 through 4 with similar but non-suffixed reference numerals. It will be understood that flared armor sections 4, 4A, 4B, 4C, 6, 6A, 6B and 6C need not be separate elements, but can form a single, integrated bell-like unit. In FIG. 14, armor sections 4 and 6 form a sector or quadrant of a bell. Other pairs of bell armor sections (4A and 6A, 4B and 6B, 4C and 6C) form remaining sectors of the bell. FIG. 7 is a sectioned view of quarter subassemblies 2, 2A, 2B and 2C in FIG. 11.

FIG. 7 is sectioned like FIG. 3, and subassembly 2 is the same in FIGS. 3 and 7. In FIG. 7, subassemblies 2A and 2B are mirror images of subassembly 2 and subassembly 2C the same as subassembly 2 rotated 180 degrees. Armor plates 28, 28A, 28B and 28C fit with armor sections 6, 6A, 6B and 6C to form a continuous girdler of armor about duct sections 16, 16A, 16B and 16C.

Figure 6:
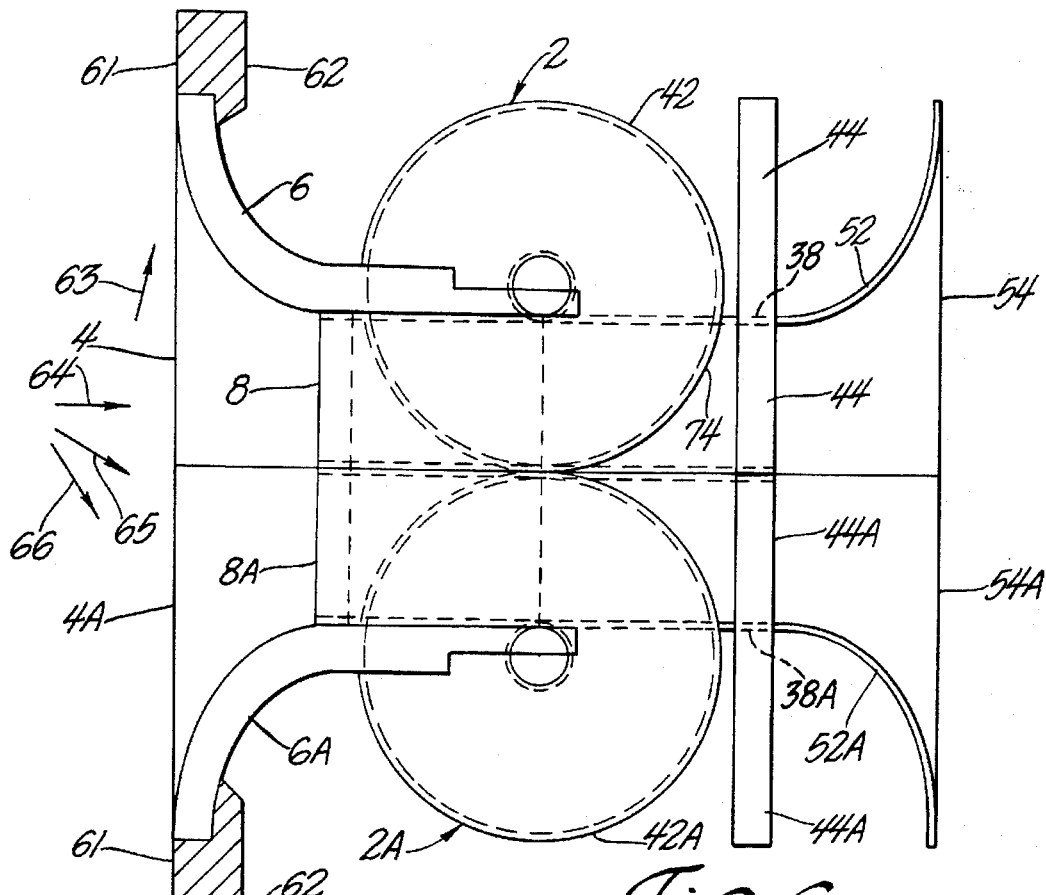
FIG. 6 is a view taken along line 6—6 in FIG. 11 and shows a plan view of two modules joined together.
Figure 7:
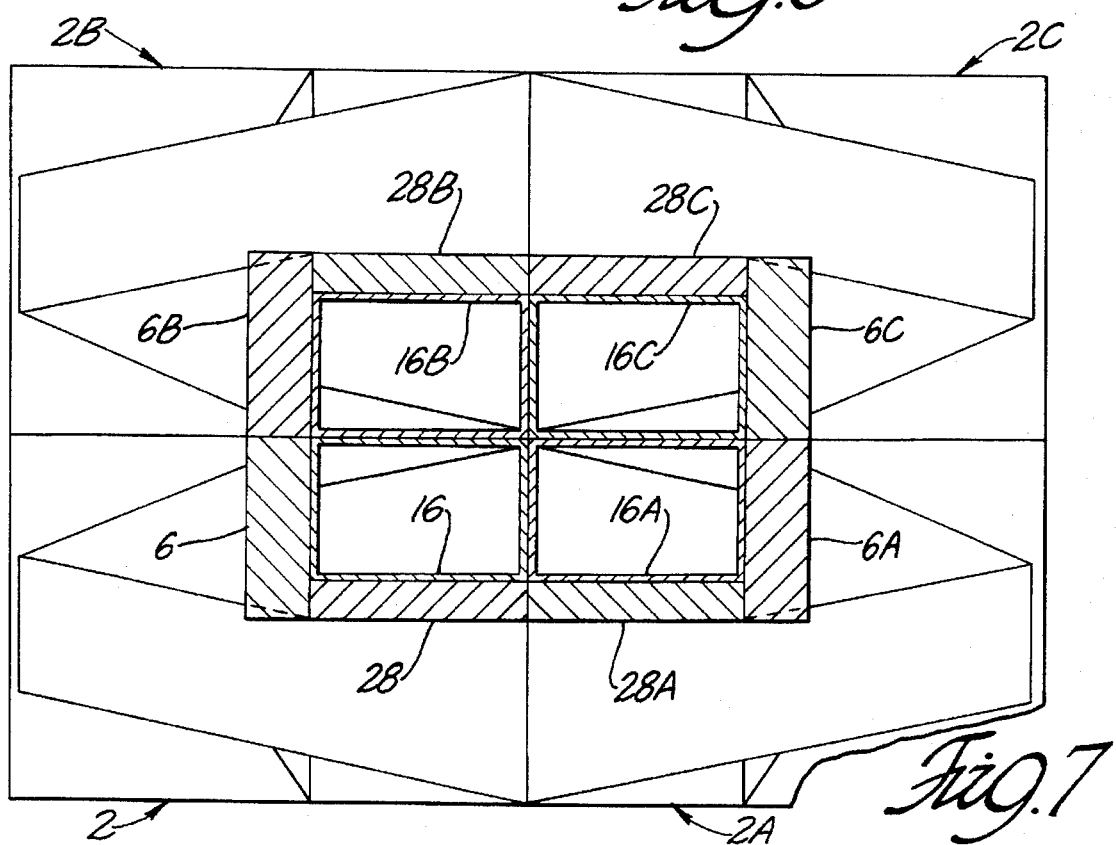
FIG. 7 is a view of four modules assembled together to form my air passage, the view being sectioned similarly to FIG. 3.
Figure 8:
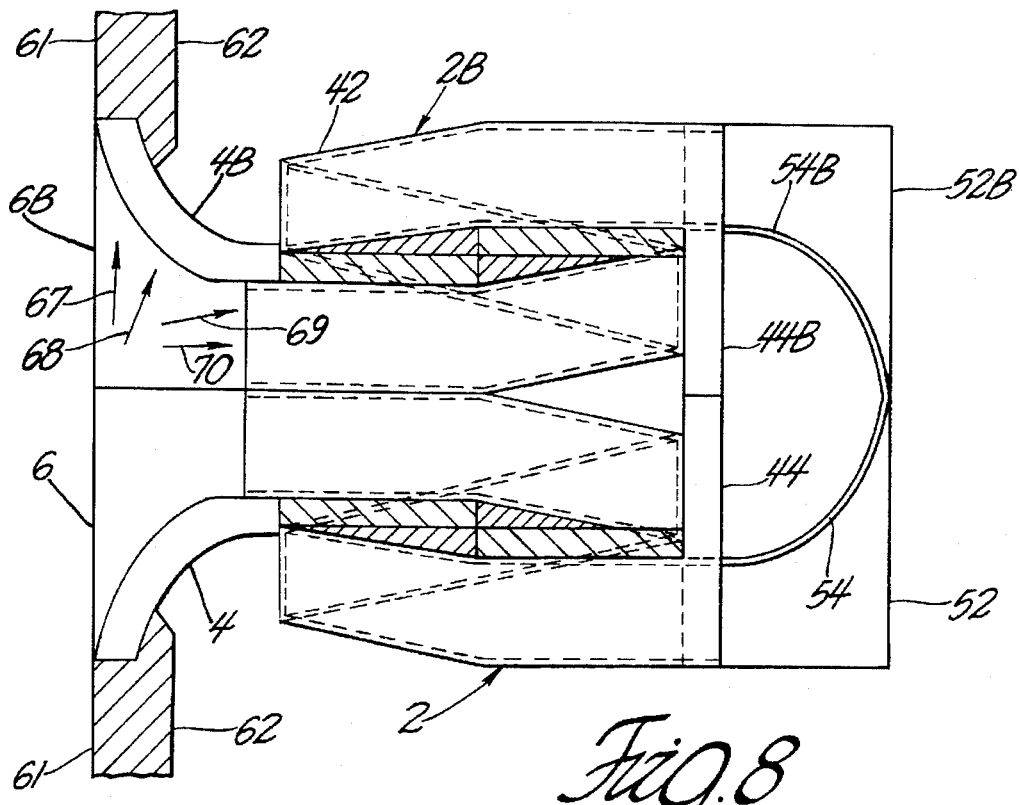
FIG. 8 is a view taken along line 8—8 in FIG. 11 and shows a side view of two modules joined together.

At 62 in FIGS. 11, 6 and 8 are shown portions 62 of hull plates of an armored vehicle body or other armored structure (not shown). The exterior surfaces 61 of hull plates 62 are flush with the outer edges of the flared armor sections, whereby the flared armor sections form an unobstructed, low-turbulence entryway to the ducts. Because the flared armor sections are smoothly curved and do not form sharp corners with the hull, they will have a reduced signature for radar or other detection devices. The lack of louvers or slats across the entryway formed by the flared armor sections obscures the assembly's infrared signature.

Referring now to FIG. 6, projectiles travelling along directions 63 and 66 will be deflected from the intake assembly respectively by armor sections 6 and 6A. A projectile flying along direction 65 will be deflected off the straight portion of armor section 6A and be caught by relatively soft armor plate 44. The use of a relatively soft armor material for plate 44 is preferred since such a soft armor plate has less tendency to ricochet or spall than harder, more brittle armor plates. An air intake element such as a fan or filter on the opposite side of plates 44 and 44B from the ducts will thus be protected from flying debris. A projectile travelling along direction 64 will also be caught by armor plate 44.

In FIG. 8, projectiles travelling along directions 67 and 68 will deflect off armor section 4B away from the air intake assembly. Projectiles travelling along direction 69 will deflect off the straight portion of armor section 4B and will be caught by armor plate 44B, and projectiles travelling in direction 70 will be caught by armor plate 44B. In a combat scenario, the damage to the ducts caused by projectiles travelling along directions 64, 65, 69 and 70 is regarded as acceptable. In fact, the duct is preferably made of sheet metal or other material that is relatively easily penetrated by bullets. By this choice of duct construction, projectiles entering the ducts will not be guided by duct walls through a series of ricochets to and through the exit ends of the ducts. Rather, the projectiles will pierce the duct walls and thereafter be caught by the armor plates.

Figure 9:
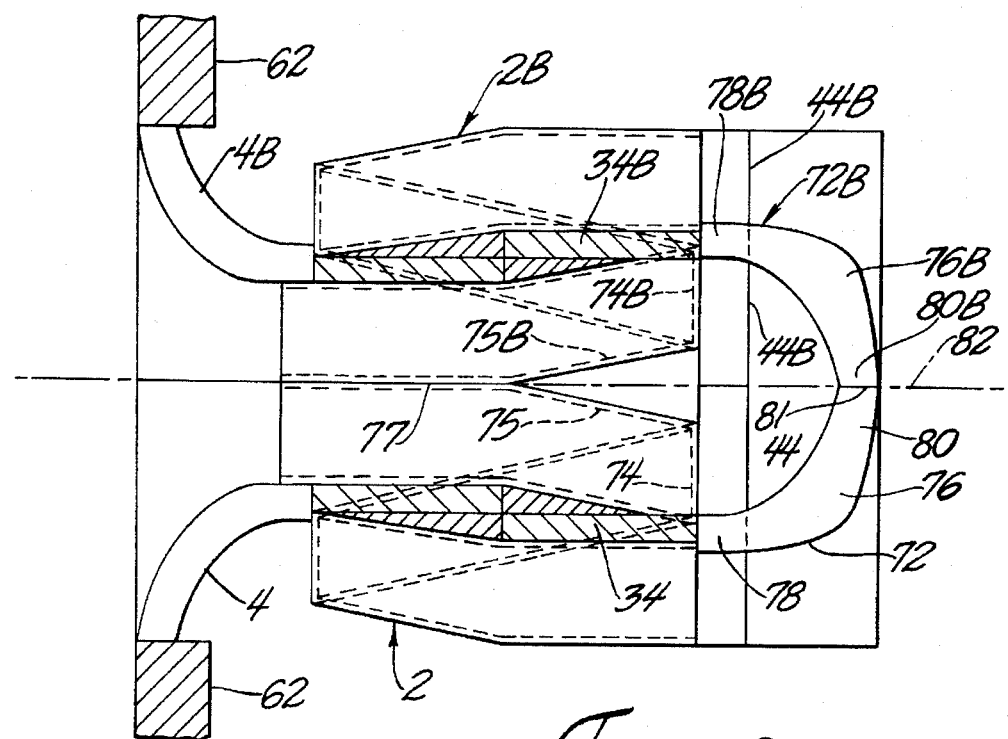
FIG. 9 is a side view of two joined modules of an alternate embodiment of my invention.

In FIG. 9 is shown a modification to the FIG. 8 structure, where flared armor sections 72 and 72B form a channel that replaces bell wall sections 54 and 54B. Sections 72 and 72B are similar but not identical with armor sections 4 and 4B in configuration and are of soft armor steel or other soft armor material. Armor section 72 has a reinforced or thicker armor zone 76 which aligns axially with duct wall zone 74. Section 72 has relatively thinner armor zones 78 and 80 integrally adjoined thereto. Thinner armor zone 80 is axially aligned with duct wall section 75, which will deflect or retard projectiles entering the duct near axis 82 and travelling along this axis. Thinner armor section 78 aligns axially with armor plate 34 and will be struck only very obliquely by incoming projectiles.

It will be understood that elements 34B, 44B, 75B, 76B, 78B and 80B in subassembly 2B are mirror-image counterparts to corresponding elements in subassembly 2 in FIG. 9. It will be noted that the interface 81 between armor sections 72 and 72B is aligned with interface 77 between the respective straight duct sections of subassemblies 2 and 2B, so that duct walls at interface 77 shield interface 81 from projectiles entering the subassemblies from the left in FIG. 9. It is possible to and may be desired in some cases to eliminate plates 44 and 44B from the FIG. 9 configuration.

Figure 10:
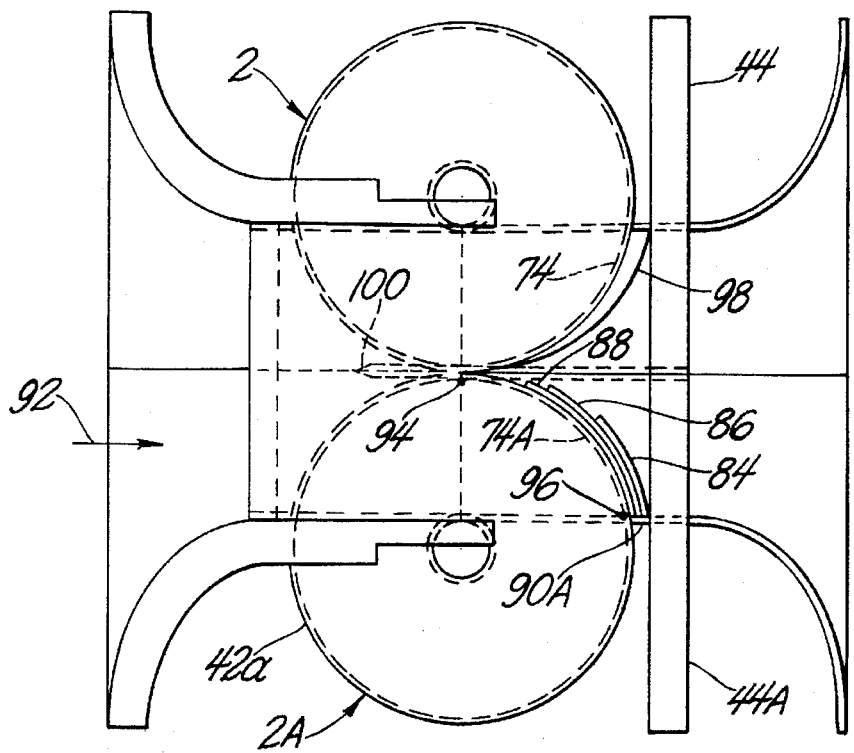
FIG. 10 is a plan view of two modules joined together showing optional modifications to my air passage.

FIG. 10 shows optional modifications to the structure of FIG. 6, wherein one quadrant of the spiral duct portion 42A of subassembly 2A has been reinforced by flat arcuate leaves of soft armor steel or other soft armor material shown at 84, 86 and 88. Inner leaf 88 extends from duct wall section 90A, faces against another duct wall section ill the region of zone 74A and spans an angle of 90 degrees. Intermediate leaf 86 also extends from duct wall section 90A, but faces against the radially outer face of leaf 88 and spans an angle of 60 to 80 degrees. Outer leaf 84 extends from section 90A from 40 to 50 degrees and faces against the radially outer face of intermediate leaf 86.

The initial turn of the radially outer duct wall of spiral duct portion 42A lies between point 94 at the beginning of spiral section 42A and point 96 at duct wall section 90A. Relative to a projectile path parallel to arrow 92, this initial turn is progressively less oblique in the FIG. 10 clockwise direction. The leaves' arrangement provides armor reinforcement that progressively increases as the initial turn's obliqueness to direction 92 decreases. The obliqueness of a first duct wall portion adjacent point 94 in the initial turn will enhance this first portions's ability to deflect projectiles travelling parallel to direction 92. The thickness of armor reinforcement at a second duct wall portion in the initial turn adjacent point 96 will enhance retardation or capture of such projectiles by the second portion or the armor leaves reinforcing it. A third duct wall portion between the first and second wall portions will resist projectile penetration by a combination of obliqueness and armor leaf reinforcement.

Also shown in FIG. 10 is curved, tapered armor reinforcement member 98, which can replace the combination of leaves 84, 86 and 88. In addition, the FIG. 10 embodiment of my invention has a truncated straight duct wall section 100 tapered in the outer or upstream direction, the effect of section 100 being to reduce intake air flow turbulence.

Figure 12:
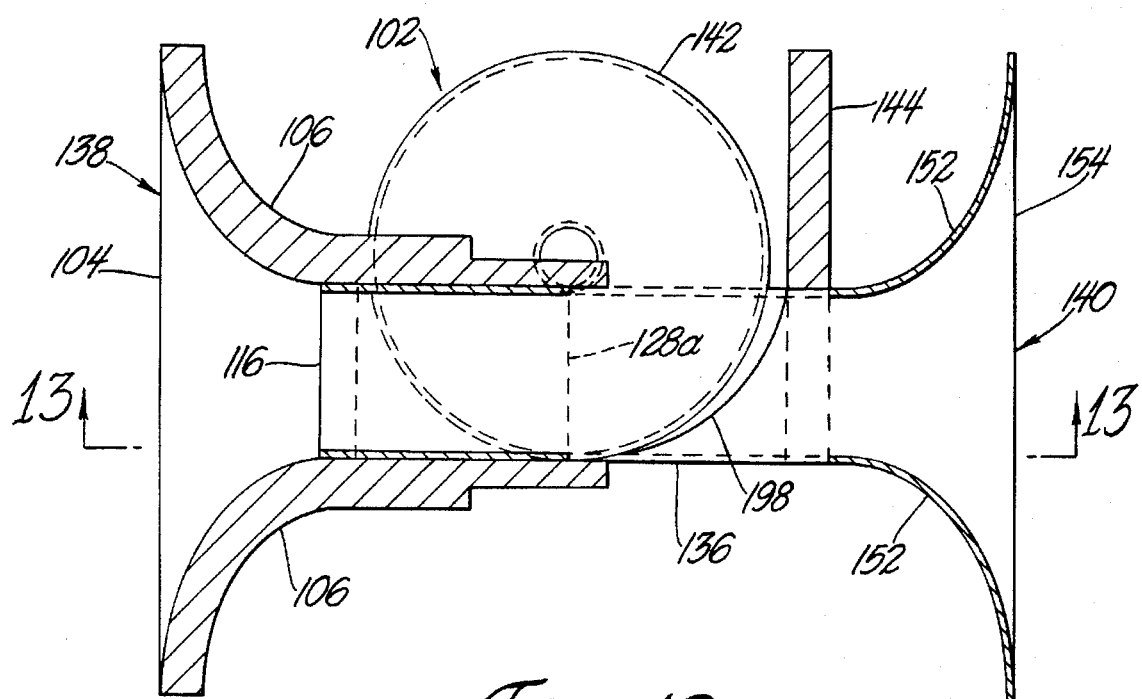
FIG. 12 is a plan view of another alternate embodiment of my air passage.
Figure 13:
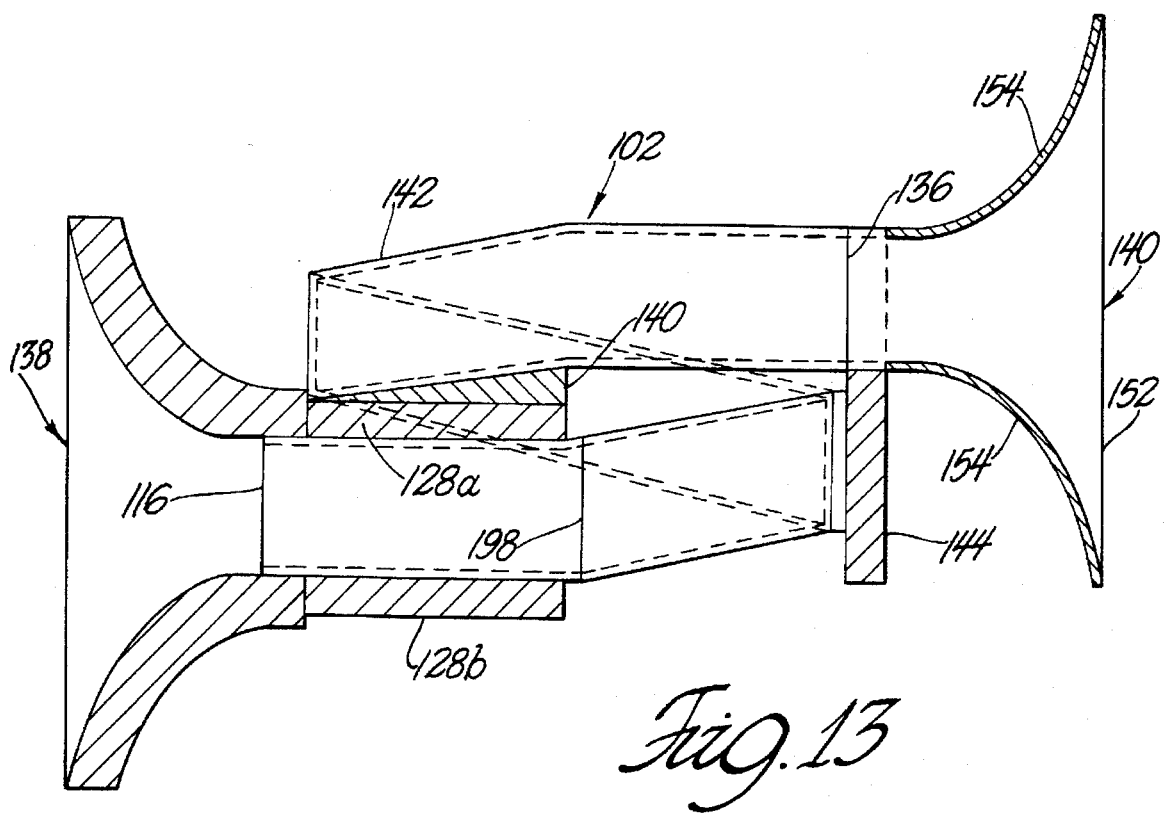
FIG. 13 is a view taken along line 13—13 in FIG. 12.

FIGS. 12 and 13 show an alternate embodiment 102 of my air intake mechanism having a single air duct with spiralled duct portion 142 being the same as spiralled duct portion 42 in FIGS. 1 through 3. Straight duct sections 116 and 136, analogous to straight duct sections 16 and 36 respectively, communicate spiralled duct portion to armored bell 138 and exit bell 140. Armor bell 138 is comprised of flared armor sections 106 analogous to armor section 6 and is further comprised of flared armor section 104 analogous to the combination of armor sections 4 and 4A in FIG. 6. Likewise, exit bell is comprised of bell wall sections 152 analogous to bell wall section 52 and is further comprised of bell wall section 154 analogous to the combination of bell wall sections 54 and 54A in FIG. 6. Plate 144 of relatively soft armored steel is analogous to armor plate 44 and faces spiralled duct portion 142. Armor plates 128a and 128b face against opposed walls of straight duct portion 116 and spacer 140 lies between plate 128a and spiralled duct portion 142. Curved, tapered armor member 198, which corresponds to armor member 98, faces against the radially outer wall of the quarter sector of spiralled duct portion 142 adjacent straight duct portion 116.

I do not desire to be limited to the exact details of construction or method shown herein since obvious modifications will occur to those skilled in the relevant arts without departing from the scope and spirit of the following claims.

I claim:

1. An air passage module for an armored vehicle, comprising:

a straight outer duct portion having an outer duct opening;

a first armor plate bearing on the outer duct portion;

a first bell armor section extending from the first armor plate and curving away from the outer duct opening;

a second armor bell section adjacent the first bell section and curving away from the outer duct opening;

a spiral duct portion joining the straight outer duct portion;

a spiral axis about which the spiral duct portion is disposed;

an inner straight duct portion joining the spiral duct portion and spaced from the outer straight duct portion at least in a direction parallel to the spiral axis;

a second armor plate on the inner straight duct portion and faced toward the spiral duct portion;

wherein the spiral duct portion is between the second armor plate and the bell sections.

2. A ballistically protective air passage module for an armored structure, comprising:

a duct having one end and another end;

a spiral axis;

a spiral portion of the duct wound about the spiral axis;

the duct having a first opening at the one end and a second opening at the other end, the first opening displaced relative to the second opening in at least one direction, the one direction being parallel to the spiral axis;

a continuous girdler of armor surrounding the duct at the one end;

an armor bell section extending from the girdler and flaring from the duct;

means at the other end of the duct for catching projectiles;

wherein the spiral portion is between the bell sector and the catching means.

3. The module of claim 2 comprising:

a single duct;

a plurality of the bell sections forming a bell at the one end of the duct.

4. The module of claim 3 comprising:

an exterior armor plate on the structure, the exterior plate having an aperture;

an end of the bell flush with the exterior armor plate, whereby the duct is recessed with respect thereto.

5. The module of claim 4 wherein the bell defines a smoothly curved, unobstructed passageway to the duct.

6. The module of claim 2 wherein the catching means is a plate made of more malleable armor material than the outer bell section.

7. The module of claim 2 further comprising: an exterior armor plate on the armored structure, the exterior plate having an aperture with respect to which the first opening is recessed;

a curved zone in the spiralled portion of the duct exposed to the first opening, at least a subzone of the curved zone oblique to paths normal to the exterior plate.

8. The module of claim 7 further comprising:

proximal parts of the curved zone closer than other parts of the curved zone to the exterior plate, the proximal parts more oblique to the paths than the other parts;

an armor member faced against the curved duct wall zone, the armor member thicker at the other parts than at the proximal parts.

9. The module of claim 2 further including means for removing particulate matter from an air stream flowing through the duct, the removing means comprised of a radially outer wall of the spiralled portion faced toward the spiral axis, the radially outer wall defining an elongate slot.

10. A low signature, low restriction, ballistically protective air passage assembly formed by a plurality of modules, wherein each module comprises:

a duct;

a spiral axis;

a spiral portion of the duct wound about the axis;

the duct having an outer opening at one end and an inner opening at another end, the outer opening remote from the inner opening in a direction parallel to the axis;

an bell section of armor material at the outer opening, the bell section curvedly flaring away from the duct;

an armor plate adjacent the bell section and faced on the duct at the one end;

means for catching projectiles at the other end of the duct;

wherein the spiral portion of the duct is between the bell section and the catching means;

wherein the one ends of the ducts are adjacent one another, the bell sections together form an unobstructed bell and the armor plates form a continuous girdler encircling the one ends.

11. The air passage assembly of claim 10 wherein the catching means comprises flat plates at the other ends of the ducts, the flat plates facing the bell.

12. The air passage assembly of claim 10 wherein the catching means comprises inner armor sections extending away from the inner openings, the inner bell sectors together forming a channel open toward the outer openings.

* * * * *